United States Patent
Liu et al.

(10) Patent No.: US 7,111,198 B2
(45) Date of Patent: Sep. 19, 2006

(54) MULTITHREAD AUTO TEST METHOD

(75) Inventors: Win-Harn Liu, Taipei (TW); Jeff Song, Taipei (TW); Yong-Juen Shi, Tianjin (CN)

(73) Assignee: Inventec Corporation, Taipei (TW)

( * ) Notice: Subject to any disclaimer, the term of this patent is extended or adjusted under 35 U.S.C. 154(b) by 547 days.

(21) Appl. No.: 10/459,450

(22) Filed: Jun. 12, 2003

(65) Prior Publication Data

US 2004/0268182 A1 Dec. 30, 2004

(51) Int. Cl.
G06F 11/10 (2006.01)

(52) U.S. Cl. .......................... 714/25; 714/30; 714/703; 702/117; 702/118

(58) Field of Classification Search ................ 702/118; 714/703, 729
See application file for complete search history.

(56) References Cited

U.S. PATENT DOCUMENTS

| | | | | |
|---|---|---|---|---|
| 3,806,878 A * | 4/1974 | Edstrom | | 714/46 |
| 5,544,308 A * | 8/1996 | Giordano et al. | | 714/26 |
| 5,671,141 A * | 9/1997 | Smith et al. | | 701/29 |
| 5,856,984 A * | 1/1999 | Rushworth | | 714/724 |
| 6,215,320 B1 * | 4/2001 | Parrish | | 324/754 |
| 6,266,787 B1 * | 7/2001 | McDermid et al. | | 714/33 |
| 6,647,354 B1 * | 11/2003 | Gorinevsky | | 702/179 |
| 6,658,606 B1 * | 12/2003 | Link et al. | | 714/703 |
| 6,697,750 B1 * | 2/2004 | Coin et al. | | 702/108 |
| 6,820,219 B1 * | 11/2004 | Huang et al. | | 714/25 |
| 6,920,585 B1 * | 7/2005 | Fintel et al. | | 714/43 |
| 6,934,897 B1 * | 8/2005 | Mukherjee et al. | | 714/726 |
| 6,986,086 B1 * | 1/2006 | Scholten | | 714/724 |
| 2002/0124205 A1 * | 9/2002 | Grey et al. | | 714/33 |
| 2002/0199139 A1 * | 12/2002 | Dortu et al. | | 714/718 |
| 2004/0006728 A1 * | 1/2004 | Scholten | | 714/724 |
| 2004/0093180 A1 * | 5/2004 | Grey et al. | | 702/123 |
| 2005/0188262 A1 * | 8/2005 | Rosenman et al. | | 714/25 |

OTHER PUBLICATIONS

Wilson, T.C.; Basu, A.; Banerji, D.K.; Majithia, J.C., "Test plan generation and convurrent scheduling of tests in the presence of conflicts," VLSI, 1991. Proceedings., First Great Lakes Symposium on , vol., No.pp. 243-248. Mar. 1-2, 1991.*

* cited by examiner

Primary Examiner—Bryce P. Bonzo
Assistant Examiner—Jack W. Szeto
(74) Attorney, Agent, or Firm—Birch, Stewart, Kolasch & Birch, LLP (57) ABSTRACT

A multithread auto test method is disclosed for the test process of computer hardware. According to the exclusion relation among the unique IDs of the test items, a multithread executable logic is automatically generated. An appropriate parallel method is employed to find procedures for test items that do not have conflicts. Therefore, multithreads of test procedures are performed to increase the test efficiency and quality. The method includes the steps of: determining a unique ID of a test item; automatically generating a test logic table according to the exclusion relation among the unique IDs; and performing multithread test procedure according to the test logic given in the test logic table.

8 Claims, 9 Drawing Sheets

| System.Hard Disk.HD1 | Sequential Seek |
|---|---|
| device name | test name |

FIG 7

|  | HD1. Sequential Seek | HD1. Random Seek | HD2. Sequential Seek | HD2. Random Seek |
| --- | --- | --- | --- | --- |
| HD1. Sequential Seek | no | no | yes | yes |
| HD1. Random Seek | no | no | yes | yes |
| HD2. Sequential Seek | yes | yes | no | no |
| HD2. Random Seek | yes | yes | no | no |

FIG 8

MULTITHREAD AUTO TEST METHOD

BACKGROUND OF THE INVENTION

1. Field of Invention

The invention relates to a test method and, in particular, to a multithread auto test method for computer hardware tests.

2. Related Art

Figure 1A:
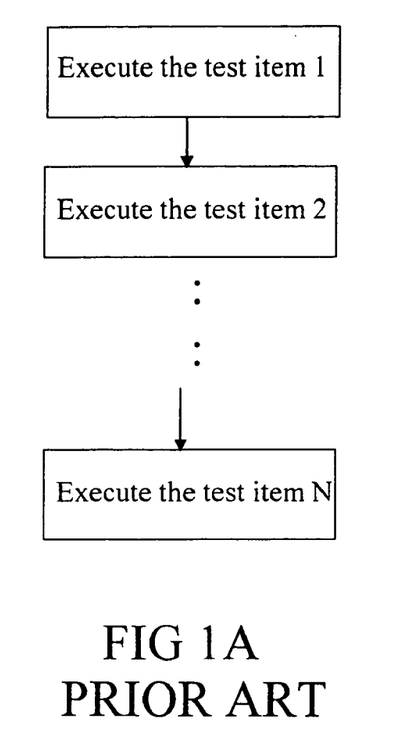
FIG. 1A is a schematic view of the conventional serial test method.

Normally, computer hardware in a Windows environment is tested using the serial test method. As shown in FIG. 1A, hardware test items are performed one after another. Although this method has the advantage of no interference between each individual tests, it does have the following drawbacks.

(1) The test efficiency is low. A test is not started until its previous test is done. Therefore, it takes a longer time to finish all the test items of the computer. Of course, the yield efficiency of the assembly thread is seriously affected.

(2) It has potential test loopholes. The serial test method does not consider the situation of testing several hardware devices at a time.

Figure 1B:
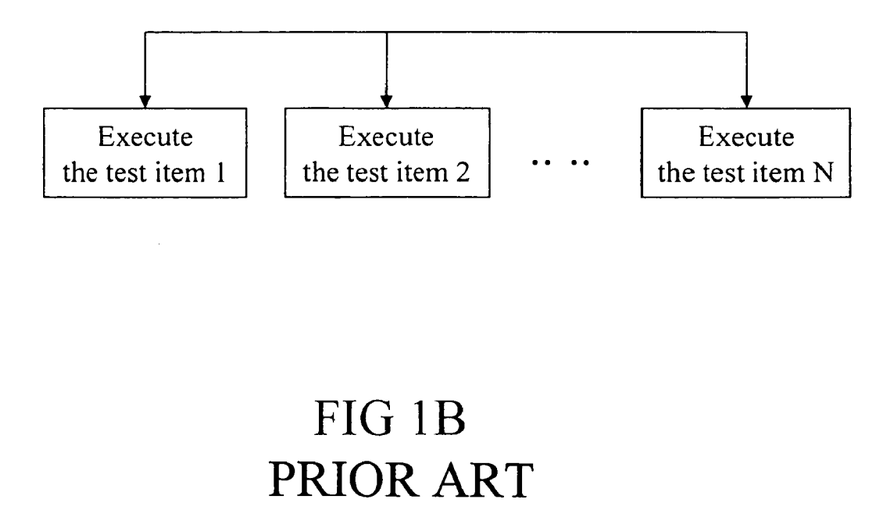
FIG. 1B is a schematic view of the conventional parallel test method.

To eliminate the drawbacks of the serial test method, a parallel test method can be used. The basic idea is to generate a test thread for each test item and, as shown in FIG. 1B, all the test items are tested together.

The problem of the parallel test method, however, is that different test items may interfere with one another. For example, it is impossible to perform the sequential seek test and the random seek test of the hard disk drive (HDD) together.

It is thus highly desirable to provide a test method that does not only have the high-efficiency, high-quality advantages of the parallel test method, but can also avoid conflictions in test items.

SUMMARY OF THE INVENTION

In view of the foregoing, the invention provides a multithread auto test method. According to the exclusion relation among the unique IDs of the test items, a multithread executable logic is automatically generated. An appropriate parallel method is employed to find procedures for test items that do not have conflictions. Therefore, multithreads of test procedures are performed to increase the test efficiency and quality.

The disclosed multithread auto test method includes the steps of:
determining a unique ID of a test item;
automatically generating a test logic table according to the exclusion relation among the unique IDs; and
performing multithread test procedure according to the test logic given in the test logic table.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The invention provides a multithread auto test method. This method is proposed to solve, in particular, the problems existing in the prior art when the serial or parallel test method is used to test computer hardware. The method uses the exclusion relation among the unique IDs of test items to automatically generate a test logic table. The multithread test process is then performed according to the test logic in the logic table.

Figure 2:
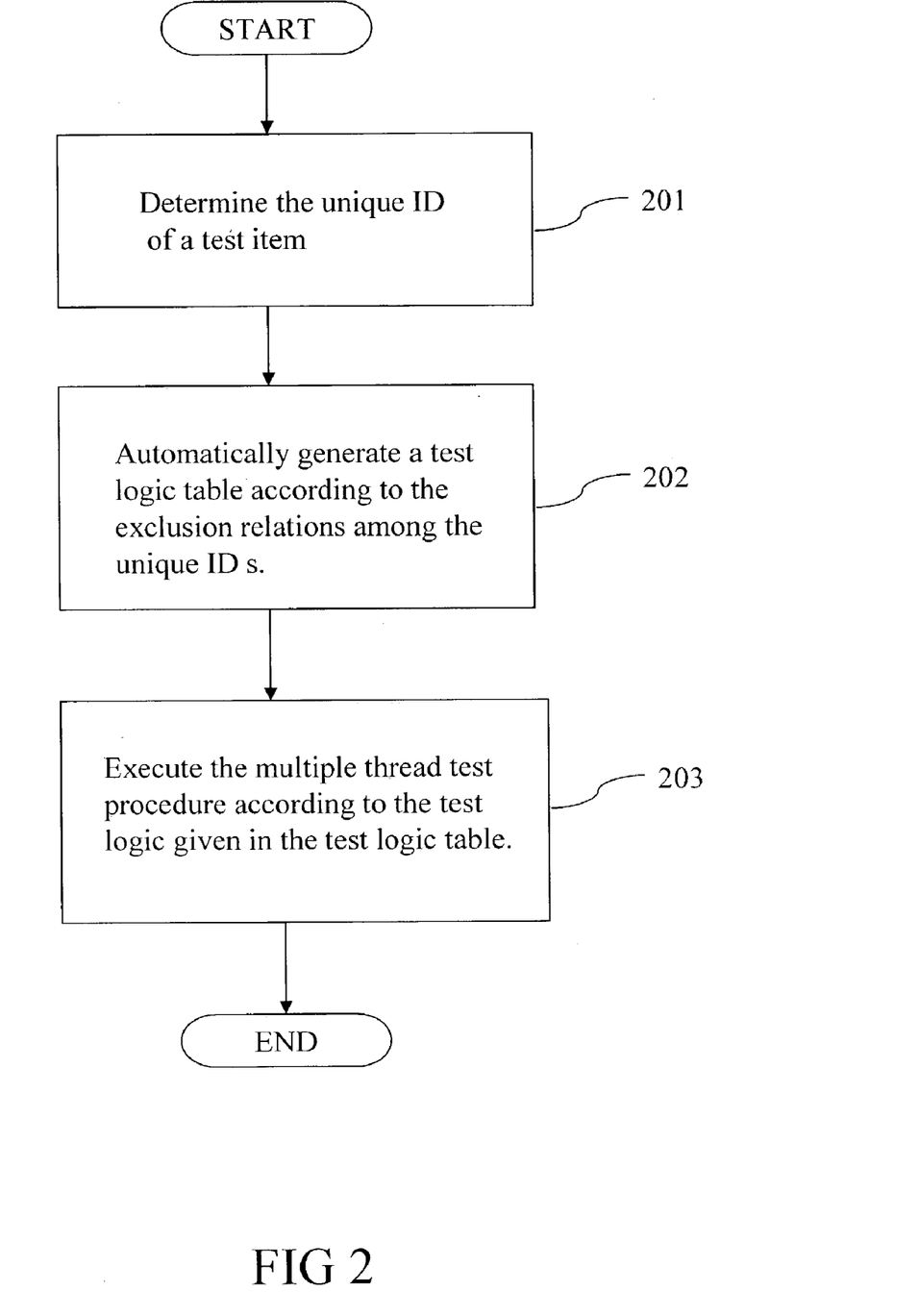
FIG. 2 is a flowchart of the disclosed multithread auto test method.

A preferred embodiment is shown in FIG. 2 to demonstrate the feasibility of the invention. First, the system determines a unique ID of a test item (step 201). A test logic table is automatically generated according to the exclusion relations among the unique IDs (step 202). The multithread test process is executed according to the test logic given in the logic table (step 203).

The unique ID of the test item can be the logic device name of the test item. It is provided according to the character of each test item and used to indicate which device is tested in the test item. The name setting standard is to include all tests items into several related tree structures.

Figure 6:
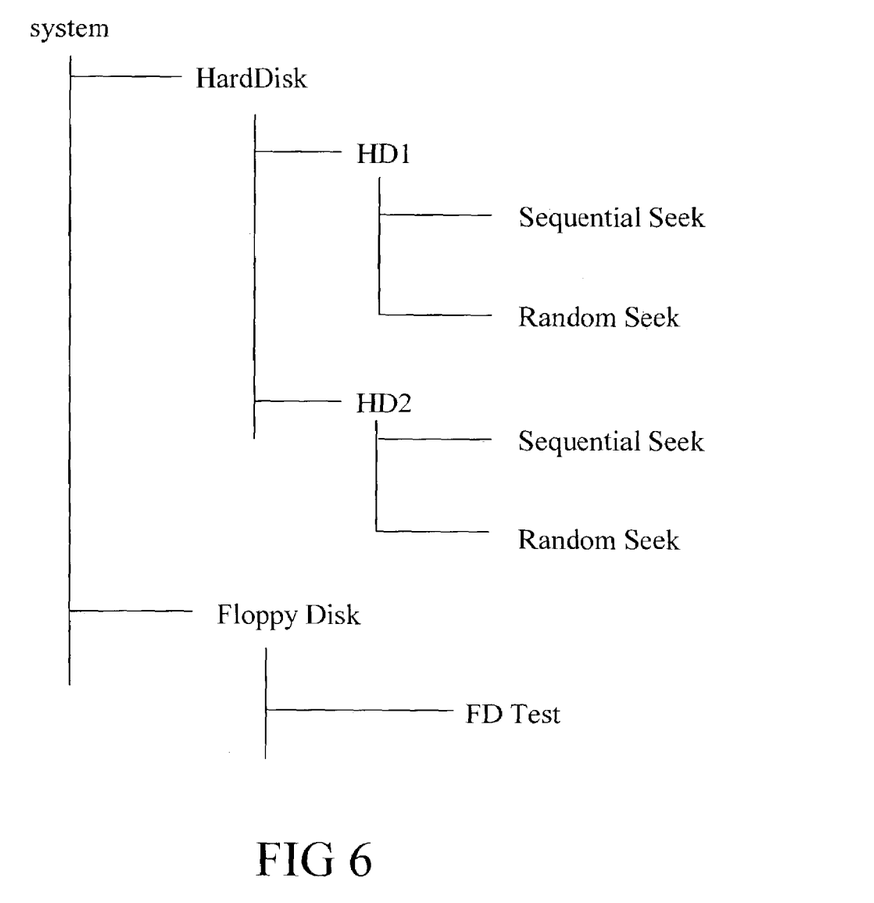
FIG. 6 is a tree structure diagram of all test items under a particular test condition.

FIG. 6 is a tree view diagram of all test items in accordance with the invention. The logic device name of the first hard drive HD1 sequential seek test item is "System.Hard Disk.HD1.Sequential Seek." Analogously, the logic device name of the floppy disk test item is "System.Floppy Disk.FD Test."

Figure 7:
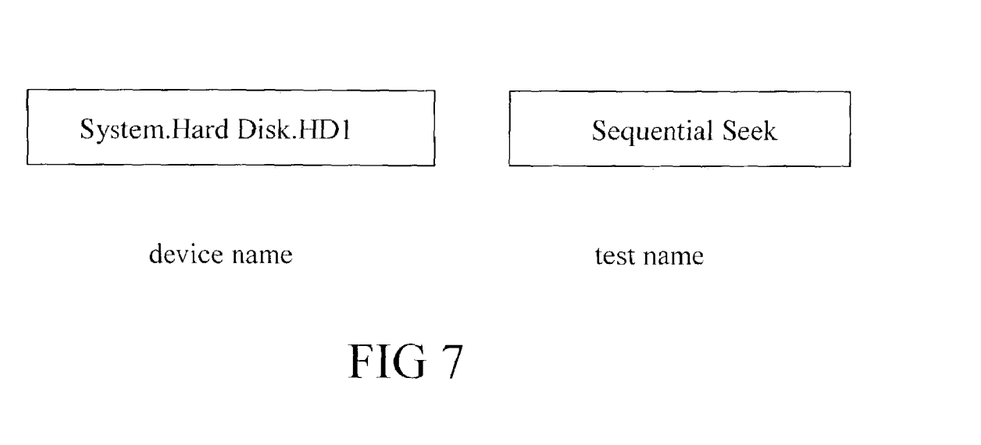
FIG. 7 is a schematic view of data formats of test items with unique ID under a particular test condition.

With reference to FIG. 7, to facilitate the description we can comprehend the logic device name as composed of two parts: "device name" and "test name." For example, "System.Hard Disk.HD1.Sequential Seek" has a device name "System.Hard Disk.HD1" and a test name "Sequential Seek."

Figure 8:
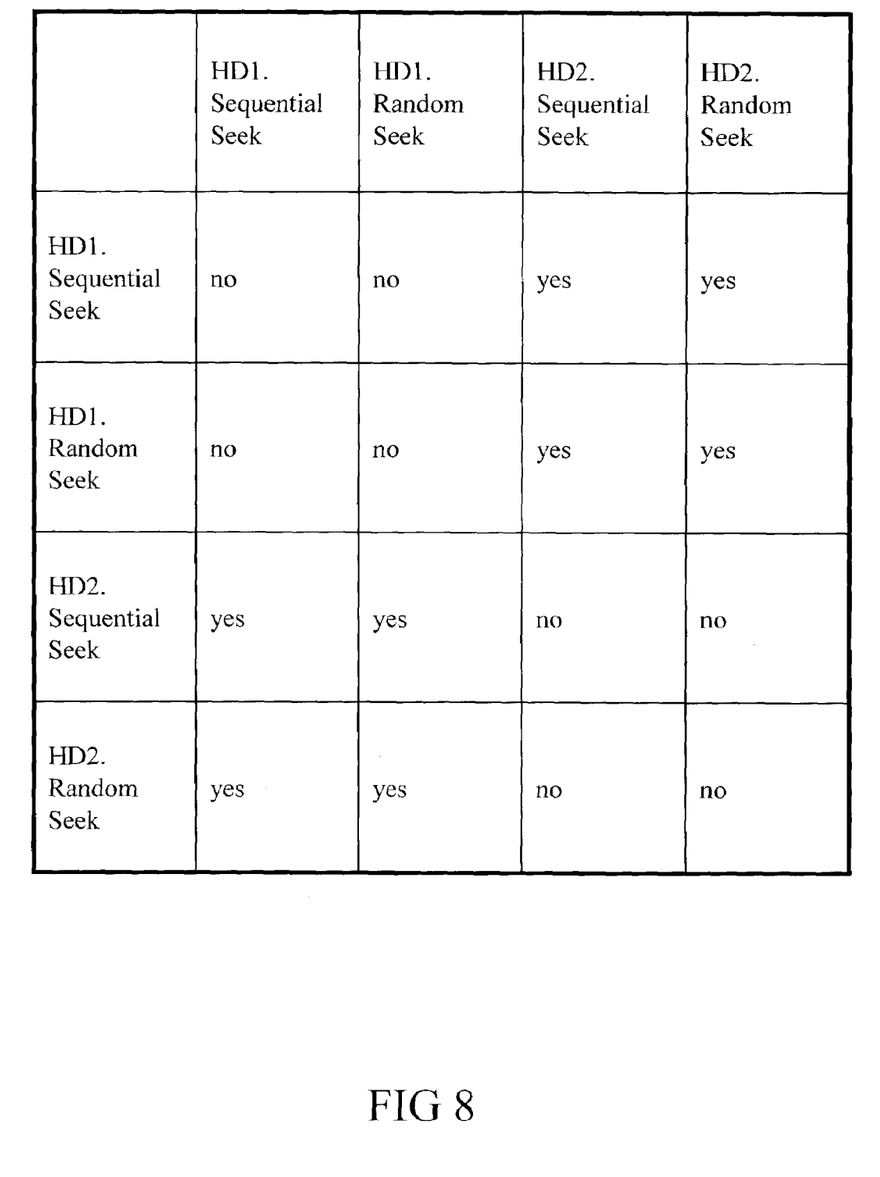
FIG. 8 shows a test logic table generated under a particular test condition.

FIG. 8 shows a test logic table generated under some test condition. In the table, "yes" means that the test items can be performed together; "no" means that the test items cannot be performed at the same time. For example, HD1.Sequential Seek can be tested with HD2.Sequential Seek, but not HD1.Random Seek.

Figure 3:
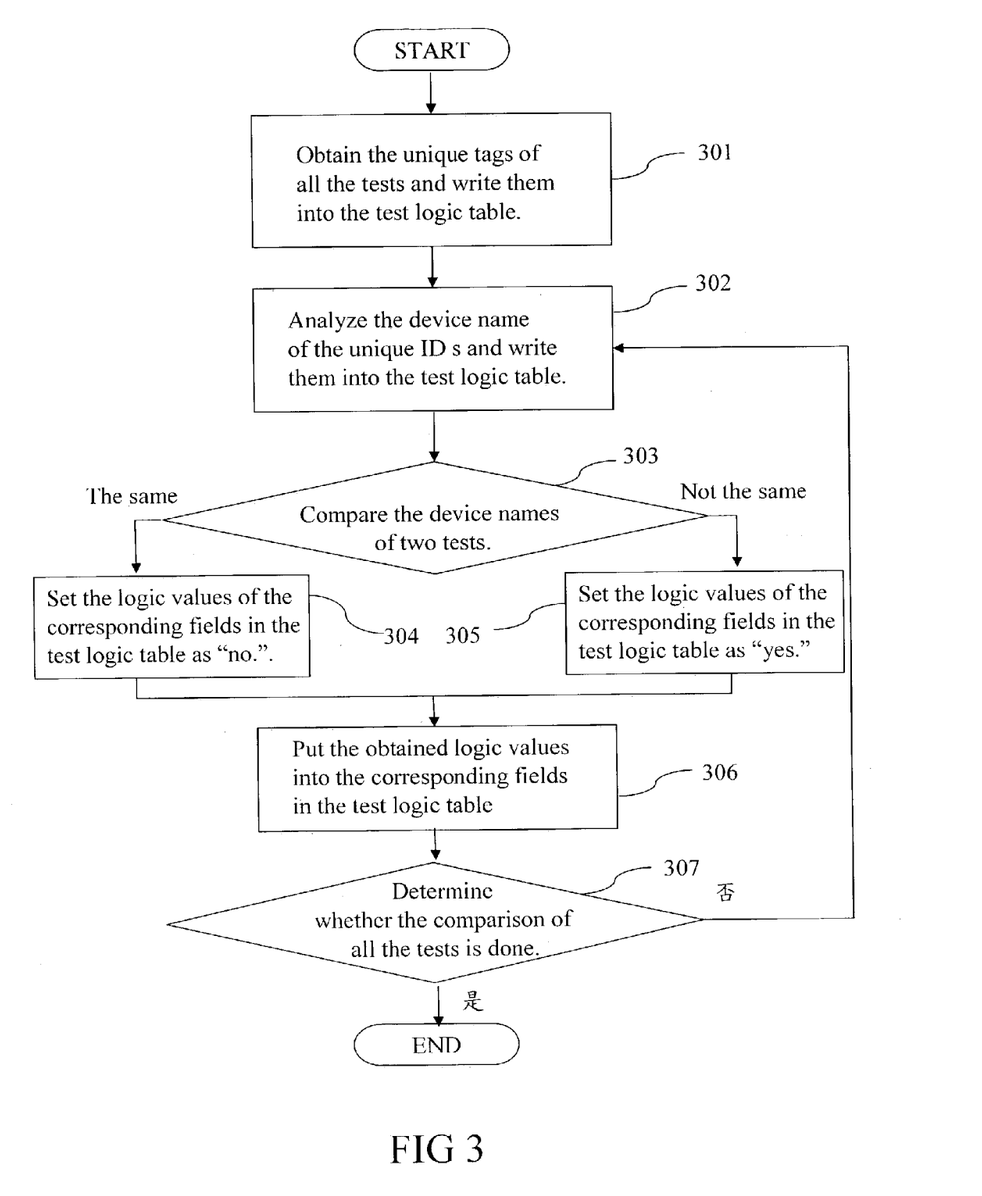
FIG. 3 is a flowchart of automatically generating a test logic table according to the invention.

FIG. 3 shows the flowchart of automatically generating a test logic table according to the disclosed method. First, the system obtains the unique IDs of all test items and writes the unique IDs into the test logic table, as shown in FIG. 8 (step

301). The system analyzes the device name of the unique ID and writes into the test logic table (step 302). The system then compares the device names of any two test items (step 303). If two test items are detected to have the same device name, then the two test items cannot be test together and the logic values of the corresponding fields in the test logic table are set to "no" (meaning that the two test items exclude each other) (step 304). If the device names of two test items are different, then they can be tested at the same time and the logic values of the corresponding fields are set to "yes" (meaning that the two test items do not exclude each other) (step 305). The obtain logic values are then filled into the corresponding fields in the test logic table (step 306). The system determines whether the comparisons of all test items are done (step 307). If so, then the procedure finishes; otherwise, step 302 continues.

In the test logic table shown in FIG. 8, since "HD1.Sequential Seek" and "HD1.Random Seek" have the same device name, they cannot be tested at the same time. The logic values of the corresponding fields are "no."

The test logic table defines the exclusion relations among all test items, i.e. whether a particular test item can be performed parallel with other test items. The test logic table is automatically generated by the system according to the logic device names of the test items.

After the system generates the test logic table, a multithread method is employed to perform tests. In order to do this, the system has two queues: the test queue and the executable queue. The test queue has all tests that are to be performed and the executable queue has the tests that are being performed at some point.

Figure 4:
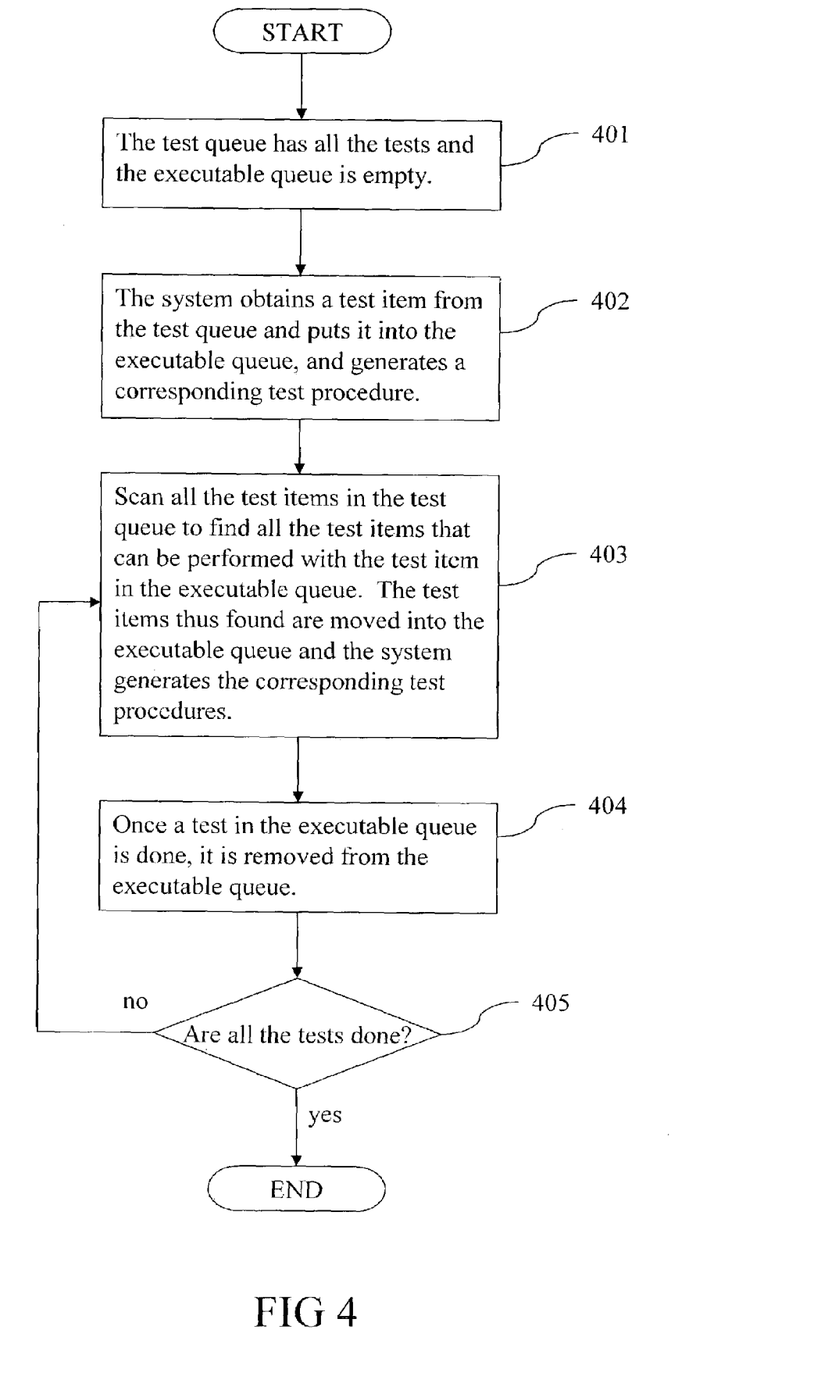
FIG. 4 is a flowchart of automatically executing a multithread test procedure according to the invention.

FIG. 4 shows the flowchart of executing multithread tests according to the disclosed method. First, the test queue has all test items to be performed and the executable queue is empty (step 401). The system obtains a test item from the test queue and puts it in the executable queue, and generates a corresponding test procedure (step 402). Afterwards, the system scans all the test items in the test queue and finds all those that can be performed at the same time with the test item in the executable queue. All the test items thus found are put into the executable queue, and the system generates the corresponding test procedure (step 403). Once a test in the executable queue is done, it along with its test procedure is removed from the executable queue (step 404). The system determines whether all the tests in the executable queue are finished (step 405). If not yet, steps 403 and 404 are repeated until all the tests in the executable queue are finished.

The scanning rule of step 403 is determined by the test logic given in the test logic table.

With reference to FIGS. 5A to 5F, an embodiment with four tests to be performed is used as an example to explain the invention.

Figure 5A:
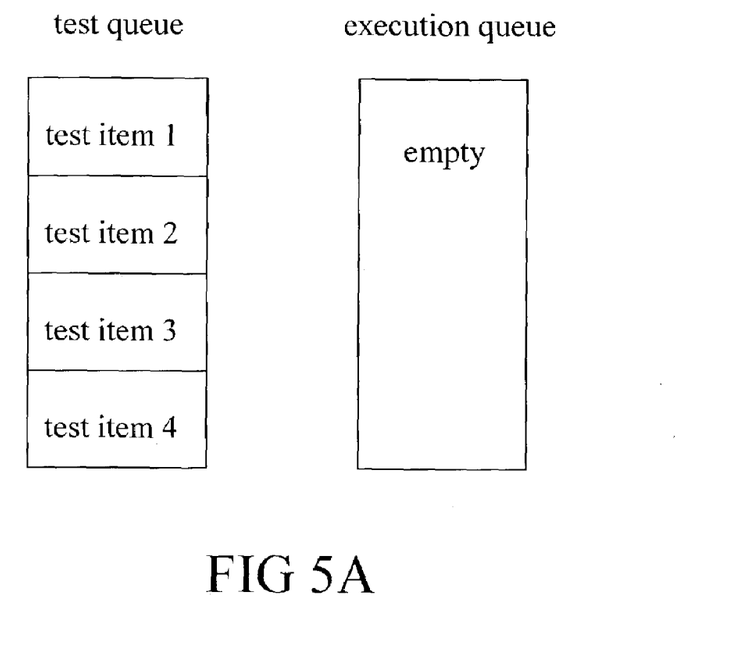
FIGS. 5A to 5F are schematic views of the multithread executable process according to the invention.

FIG. 5A represents the initial status. The test queue has all the test items and the executable queue is empty.

Figure 5B:
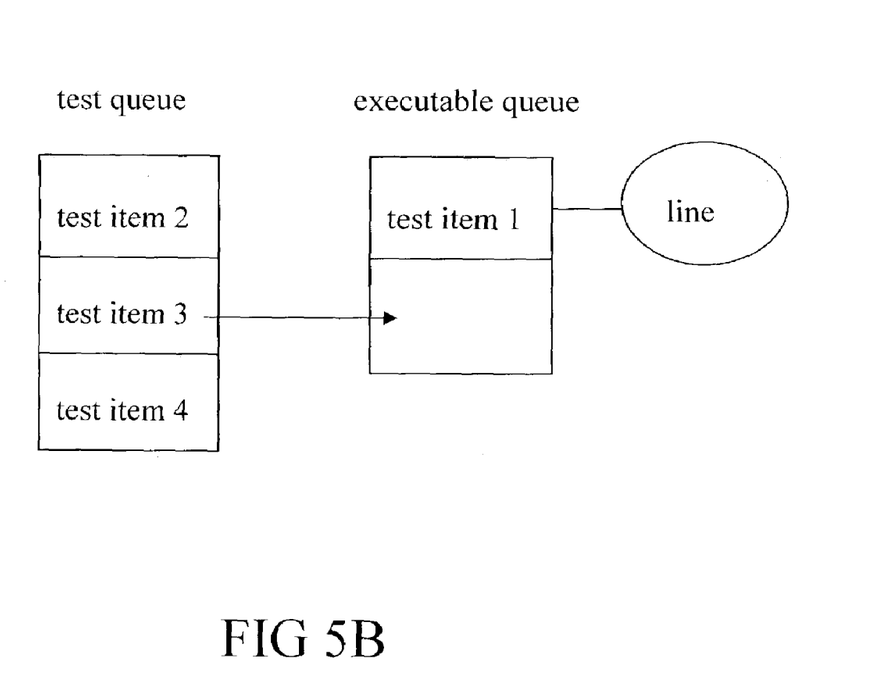
Figure 5C:
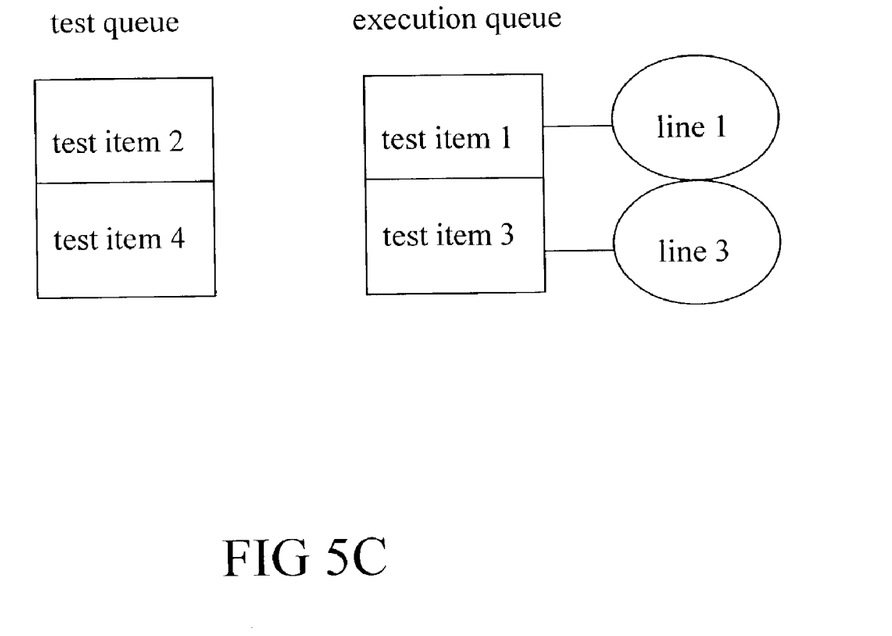

FIGS. 5B and 5C show that the system first puts the test item 1 into the executable queue and generates a test procedure 1. The system keeps scanning all tests in the test queue that can be performed at the same time with the test 1 in the executable queue. Suppose the test 3 can be performed with the test 1, then it is moved to the executable queue and the system generates a test procedure 3. Whether two test items can be performed at the same time is determined according to the test logic table automatically generated from the tests by the system.

Figure 5D:
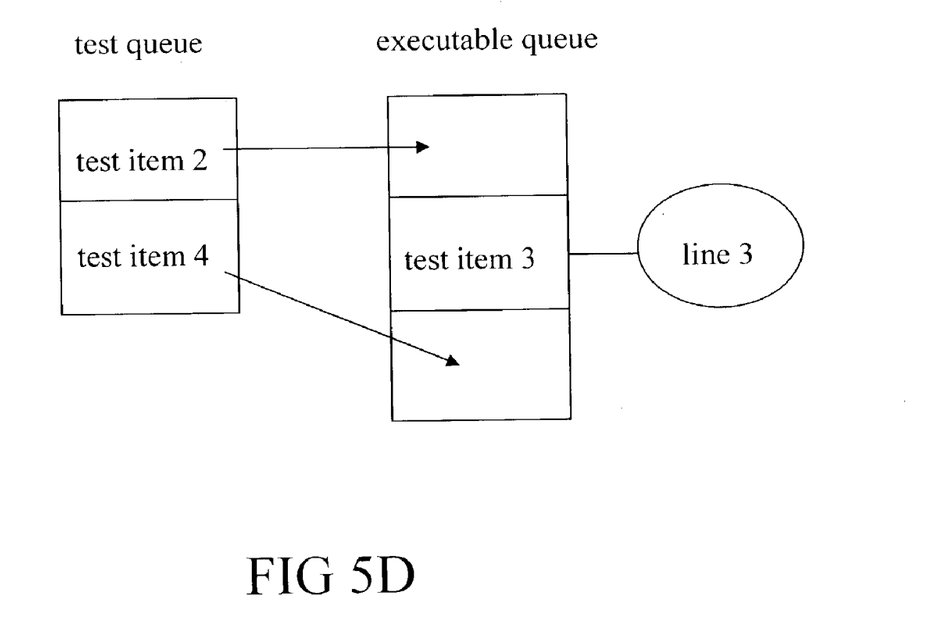
Figure 5E:
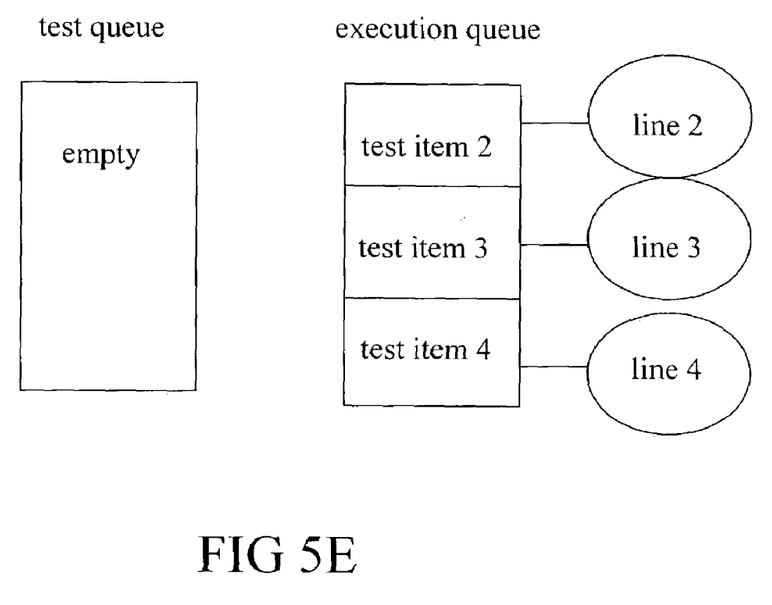
Figure 5F:
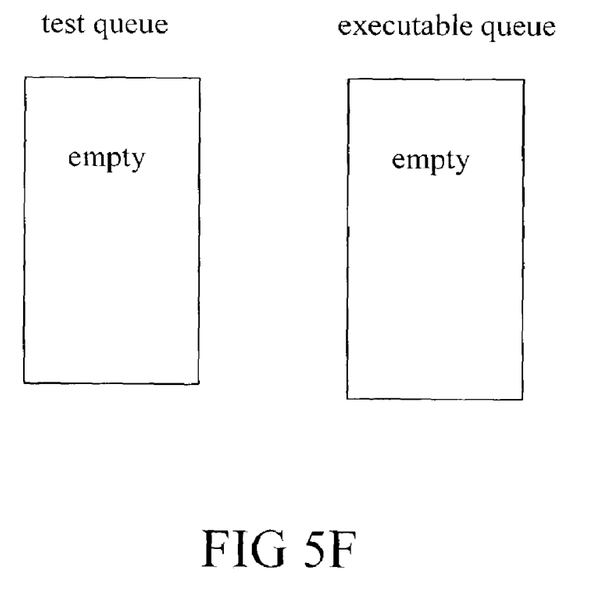

FIGS. 5D, 5E and 5F mean that if a particular test (e.g. the test 1) is done, it is removed from the executable queue. The system scans the test queue again. This process continues until all test items in the test queue are done.

Effects of the Invention

1. In the invention, each test is not definitely performed in the serial or parallel manner. They are performed using an appropriate parallel method that does not have conflictions. Therefore, the testing time is shortened and the production yield increases.
2. In the invention, the system does not perform all the test items at the same time without any consideration. The system automatically generates a test logic table. The system determines which test items can be performed together according to the states indicated in the test logic table, and which test items should be performed separately to avoid conflictions.
3. The executable logic of the multithread procedures is automatically generated, instead of by the user. The system can automatically generates a test logic table according to the unique IDs (such as logic device names) of the test items. The table is not produced manually; therefore, the operation is simplified and the error probability is greatly lowered.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multithread auto test method for testing computer hardware, comprising the steps of:

determining a unique ID for each test wherein the data format of the unique ID includes a "device name" and a "test name";

automatically generating a test logic table according to exclusion relations among the unique IDs; and executing a multithread test procedure according to the test logic given in the test logic table;

wherein the step of automatically generating a test logic table further includes the steps of:

obtaining the unique IDs of all tests to be performed and writing them into the test logic table;

analyzing the device name of each of the unique IDs and writing them into the test logic table;

comparing the device names of two tests;

putting the logic values created in the comparison step into the corresponding fields in the test logic table; and determining whether all tests have been done and, if not, redoing the analysis and comparison.

2. The method of claim 1, wherein the logic value is set as "no" if the device names of two tests are the same and as "yes" if the device names of two tests are different in the step of putting the logic values created in the comparison step into the corresponding fields in the test logic table.

3. The method of claim 1, wherein the exclusion relations among the unique IDs are determined by whether the device names of the logic device names of the tests are the same, so that the exclusion relation holds if two device names are the same and does not hold if two device names are different.

4. The method of claim 1, wherein a test queue and an executable queue are used in the step of executing a multithread test procedure according to the test logic given in the test logic table.

5. The method of claim 4, wherein the step of executing a multithread test procedure comprises the steps of:

putting all the tests in the test queue and leaving the executable queue empty;

obtaining a test item from the test queue and putting it into the executable queue, and generating a corresponding test procedure;

scanning all of the tests in the test queue to find all of the tests that can be performed at the same time with the test item in the executable queue, and moving any such tests found, into the executable queue and generating the corresponding test procedures;

removing a test that is done and the corresponding test procedure from the executable queue; and determining iteratively whether all the tests in the test queue are completed.

6. The method of claim 5, wherein the scanning rule is determined by the test logic given in the test logic table.

7. The method of claim 4, wherein the test queue has all of the tests to be performed.

8. The method of claim 4, wherein the executable queue has the test items that are being performed at a particular moment.

* * * * *